United States Patent
Ariyur (10) Patent No.: US 7,603,136 B2
(45) Date of Patent: Oct. 13, 2009

(54) SYSTEM AND METHOD TO PERFORM STABLE DISTRIBUTED POWER CONTROL IN A WIRELESS NETWORK

(75) Inventor: Kartik B. Ariyur, Minnetonka, MN (US)

(73) Assignee: Honeywell International, Inc., Morristown, NJ (US)

( * ) Notice: Subject to any disclaimer, the term of this patent is extended or adjusted under 35 U.S.C. 154(b) by 904 days.

(21) Appl. No.: 11/269,383

(22) Filed: Nov. 8, 2005

(65) Prior Publication Data

US 2007/0105581 A1     May 10, 2007

(51) Int. Cl.
*H04B 7/00* (2006.01)
*H04Q 7/20* (2006.01)

(52) U.S. Cl. .............. 455/522; 455/13.4; 455/67.13; 455/226.3; 370/252; 370/318

(58) Field of Classification Search .......... 455/67.11, 455/501, 226.1, 226.3, 69, 67.13, 13.4, 518, 455/517, 452.2, 436, 561, 522; 370/338, 370/254, 315, 252, 328, 400, 318, 327, 333
See application file for complete search history.

(56) References Cited

U.S. PATENT DOCUMENTS

| | | |
|---|---|---|
| 6,961,310 B2 | 11/2005 | Cain |
| 6,963,747 B1 | 11/2005 | Elliott |
| 7,016,306 B2 | 3/2006 | Alapuranen et al. |
| 7,111,074 B2 | 9/2006 | Basturk |
| 7,295,856 B2 | 11/2007 | Agin |
| 7,333,827 B2 | 2/2008 | Biddiscombe et al. |
| 7,339,994 B2 | 3/2008 | Lin et al. |
| 7,340,268 B2 | 3/2008 | Oh et al. |
| 2005/0176455 A1* | 8/2005 | Krishnan et al. ............ 455/522 |
| 2006/0092855 A1* | 5/2006 | Chiu ........................ 370/254 |

(Continued)

FOREIGN PATENT DOCUMENTS

JP     2005001624    *   1/2005

OTHER PUBLICATIONS

Varadarajan et al., "Analytic Framework and QOS Adaptive Mechanisms for Achieving Transport Capacity Bounds in Multi-Hop Statically Routed IE", "First Annual Conference of ITA (ACITA)", 2007, Publisher: Honeywell Aerospace Advanced Technology Labs, Published in: Minneapolis, MN.

*Primary Examiner*—Sujatha Sharma
(74) *Attorney, Agent, or Firm*—Fogg & Powers LLC (57) ABSTRACT

A method to control power transmitted from a node in a wireless network. The method includes receiving one or more signals at the node from one or more other nodes of the wireless network, determining a signal-to-interference-plus noise ratio for each signal received from each of the one or more other nodes, transmitting the determined signal-to-interference-plus noise ratio value for each signal received from the one or more other nodes to the respective one or more other nodes, and receiving a signal-to-interference-plus noise ratio value from each of the other nodes in the wireless network. The received signal-to-interference-plus noise ratio value was determined by each of the other nodes. The method further includes determining a minimum signal-to-interference-plus noise ratio for the node, estimating a rate-of-change of the channel gain, and adjusting signals transmitted from the node to the other nodes.

21 Claims, 3 Drawing Sheets

U.S. PATENT DOCUMENTS

2006/0268787 A1* 11/2006 Strutt et al. .................. 370/335
2007/0133483 A1* 6/2007 Lee et al. .................... 370/338
2007/0149204 A1* 6/2007 Redi et al. ................... 455/446
2009/0042596 A1* 2/2009 Yavuz et al. ................. 455/522

* cited by examiner

SYSTEM AND METHOD TO PERFORM STABLE DISTRIBUTED POWER CONTROL IN A WIRELESS NETWORK

BACKGROUND

In current cellular wireless systems, the uplink power provided from the base station to each mobile phone is controlled to provide an acceptable signal-to-interference-plus noise ratio to the mobile phone while minimizing the transmit power levels from the base station of the cellular tower. Some cellular wireless systems allow several users of mobile phones to communicate over a common channel. Each user of the shared channel creates interference for the other users of the channel. Such wireless systems use power control to limit the interference.

If the power level transmitted by the mobile phone is minimized, the interference is minimized for the mobile phone while maintaining the signal integrity. Systems which use the lowest transmitter power at the base stations and the mobile phone meet the minimum signal-to-interference-plus noise ratio constraint and maximize the number of channels. Additionally, users of the mobile phones obtain the maximum talk time from the battery powered mobile phones and the base station minimizes wasted excessive power when the lowest transmitter power is used by the base station. As the number of users on the system changes, the minimum signal-to-interference-plus noise ratio changes and the system must be dynamically monitored to maintain the minimum signal-to-interference-plus noise ratio for the system.

Currently, the base stations are controlled by a centralized distribution node controller, such as a mobile service switching center (MSC) that regulates the power level of all the signals transmitted from several base stations. The mobile phones are mobile nodes located within range of wireless signals emitted to and from the base stations. The distribution nodes in the wireless network are controlled by a centralized distribution node controller, such as a mobile service switching center (MSC) that regulates the power level of all the signals transmitted from the distribution nodes to receiver nodes.

Communication between the centralized distribution node controller and the distribution nodes for the mobile phone adds infrastructure, latency and network vulnerability. The latency is due to averaging received signals at the centralized distribution node controller, processing the averaged signals at the centralized distribution node controller, and transmitting signals between the centralized distribution node controller and the distribution nodes. The resulting time delays are in the range of about 10 ms to about 100 ms.

In some cases, it is necessary or desirable to set up a remote wireless communication network that is not in communication with a centralized distribution node controller. For example, the military establishes a joint tactical radio system (JTRS) including a distribution node to establish communication between soldiers operating within range of the JTRS. The soldiers carry wireless transceivers which function as the nodes within the JTRS. In an exemplary case, the JTRS is based within a group of mobile vehicles and the distribution node is a larger transceiver in one of the vehicles.

In another example, a small town in remote regions, such as remote parts of China or Alaska, establishes a wireless communication network for the people living in the remote region without the infrastructure of a centralized distribution node controller to reduce the total system cost. In both of these latter systems, there is no central controller to equalize and/or minimize the transmitted power level from the distribution node.

By distributing the power control from a centralized distribution node controller to the distribution nodes for the mobile phone, the infrastructure and the system latency are reduced. For the reasons stated above and for other reasons stated below which will become apparent to those skilled in the art upon reading and understanding the present specification, there is a need for wireless network systems, including mobile wireless network systems, that efficiently regulate the power distributed from distribution nodes without using a centralized distribution node controller.

SUMMARY OF THE INVENTION

The above mentioned problems of current systems are addressed by embodiments of the present invention and will be understood by reading and studying the following specification.

One aspect of the present invention provides a method to control power transmitted from a node in a wireless network. The method includes receiving one or more signals at the node from one or more other nodes of the wireless network, determining a signal-to-interference-plus noise ratio for each signal received from each of the one or more other nodes, transmitting the determined signal-to-interference-plus noise ratio value for each signal received from the one or more other nodes to the respective one or more other nodes, and receiving a signal-to-interference-plus noise ratio value from each of the other nodes in the wireless network. The received signal-to-interference-plus noise ratio value was determined by each of the other nodes. The method further includes determining a minimum signal-to-interference-plus noise ratio of the node, estimating a rate-of-change of the channel gain, and adjusting signals transmitted from the node to the other nodes. The adjustment is based on the determined minimum signal-to-interference-plus noise ratio of the node, the signal-to-interference-plus noise ratio value received from each of the other nodes, and the estimated rate-of-change of the channel gain so that a total power level transmitted from the node is maintained near a minimum power level.

Another aspect of the present invention provides a system to dynamically control power in a wireless network. The system includes means for receiving physical layer parameters at a media access control level of a node from a physical layer of the node, means for determining convergent system behavior within the node based on the received physical layer parameters, means for transmitting response parameters to the physical layer responsive to the determined convergent system behavior, and means for regulating transmit power levels at the node based on the received response parameters.

Yet another aspect of the present invention provides computer readable medium having computer-executable instructions for performing a method. The performed method includes receiving signals at the node from other nodes of the wireless network at a node, determining a signal-to-interference-plus noise ratio for each signal received from each of the one or more other nodes, transmitting the determined signal-to-interference-plus noise ratio value for each signal received from the one or more other nodes to the respective one or more other nodes, and receiving a signal-to-interference-plus noise ratio value from each of the other nodes in the wireless network. The receive signal-to-interference-plus noise ratio was determined by each of the other nodes. The performed method also includes determining a minimum signal-to-interference-plus noise ratio of the node, estimating a rate-ofchange of the channel gain, and adjusting signals transmitted from the node to the other nodes. The adjusting is based on the determined minimum signal-to-interference-plus noise ratio of the node, the received signal-to-interference-plus noise ratio received from each of the other nodes, and the estimated rate-of-change of the channel gain so that a total power level transmitted from the node is maintained near a minimum power level.

BRIEF DESCRIPTION OF THE DRAWINGS

The present invention can be more easily understood and further advantages and uses thereof more readily apparent, when considered in view of the description of the preferred embodiments and the following figures, in which.

DETAILED DESCRIPTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention. The following detailed description is not to be taken in any limiting sense and the scope of the present invention is defined only by the claims and equivalents thereof. In the embodiments of the present invention, a node, such as a base station in a cellular wireless system, dynamically controls the total power level transmitted from the node at any time. The dynamical control is not regulated by a higher level controller in the communication system although the transmit power used is subject to the limits of the transceiver, the maximum power it can transmit at, and the accuracy of the signals at different power levels.

Figure 1:
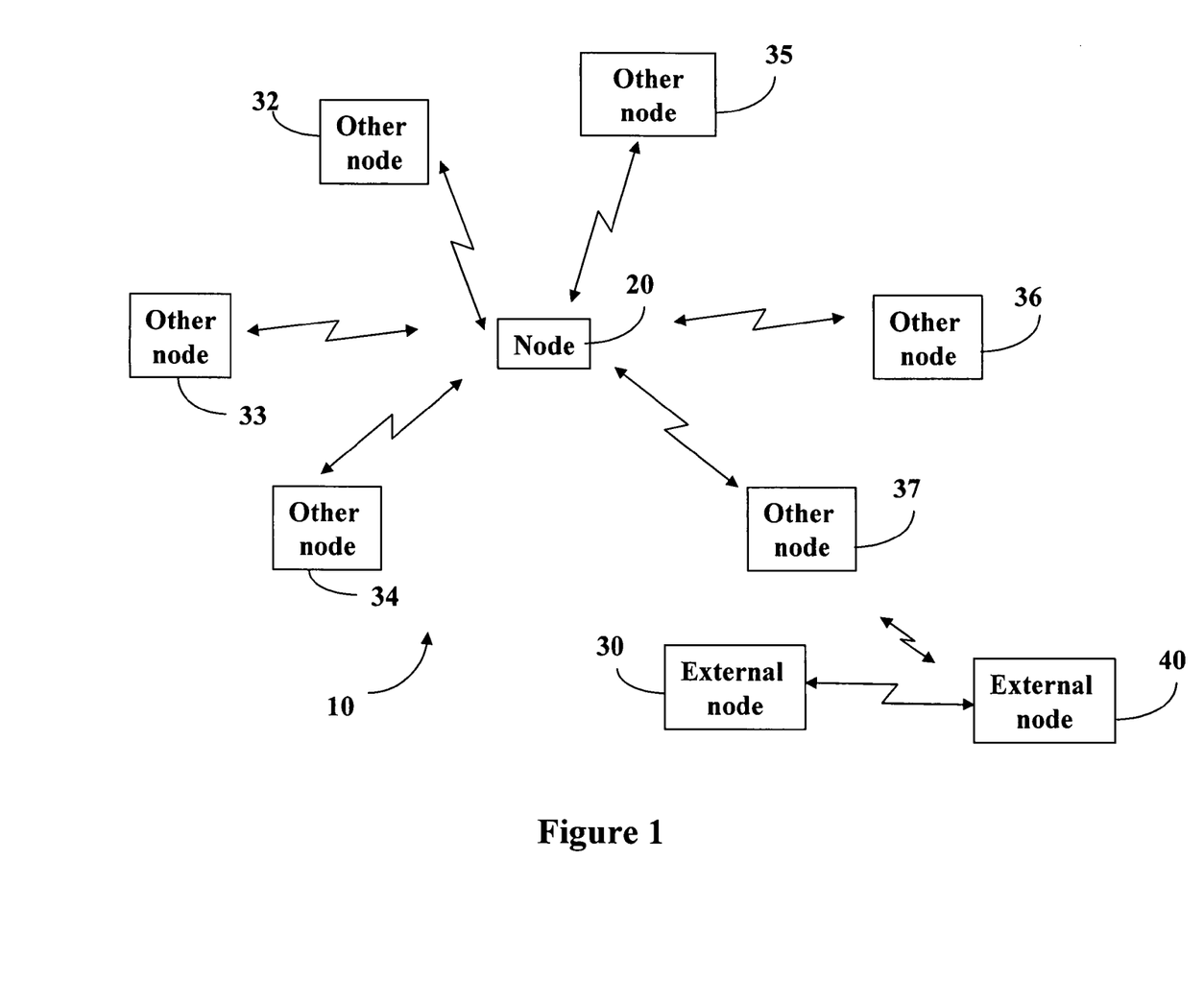
FIG. 1 is a box diagram of an embodiment of a wireless network 10 maintaining the total transmitted power level at or slightly above a minimum power level.

FIG. 1 is a box diagram of an embodiment of a wireless network 10 maintaining the total transmitted power level at or slightly above a minimum power level. The wireless network 10 includes a node 20 and other nodes 32-37. FIG. 1 also illustrates external nodes 30 and 40 that are not in the wireless network 10. The external nodes 30 and 40 are shown communication with each other. Any power received by the node 20 and/or other nodes 32-37 from the external nodes 30 and 40 contributes to the noise received by the node 20 and/or other nodes 32-37.

In one implementation of an embodiment of the wireless network 10, the other nodes 32-37 communicate with node 20 in a star network. In another implementation of an embodiment of the wireless network 10, ones of the other nodes 32-37 communicate with respective other ones the other nodes 32-37 via the node 20. In one implementation of an embodiment of the wireless network 10, a portion of the signal communicated between the external nodes 30 and 40 is received at the node 20 as noise.

The wireless network 10 does not include a higher level centralized controller, such as a mobile service switching center, that controls more than one node. Thus, the wireless network 10 is defined as decentralized since each of the nodes 20 and 32-37 in the wireless network 10 controls their power level based on the signal-to-interference-plus noise ratio feedback from each other node 32-37 in the wireless network 10. The node 20 and the other nodes 32-37 do not receive input from a higher level wireless system controller to maintain the local control of the transmitted power within the wireless network 10. The node 20 and the other nodes 32-37 recognize addresses in headers on the wireless signals and transmit received signals accordingly.

Figure 2A:
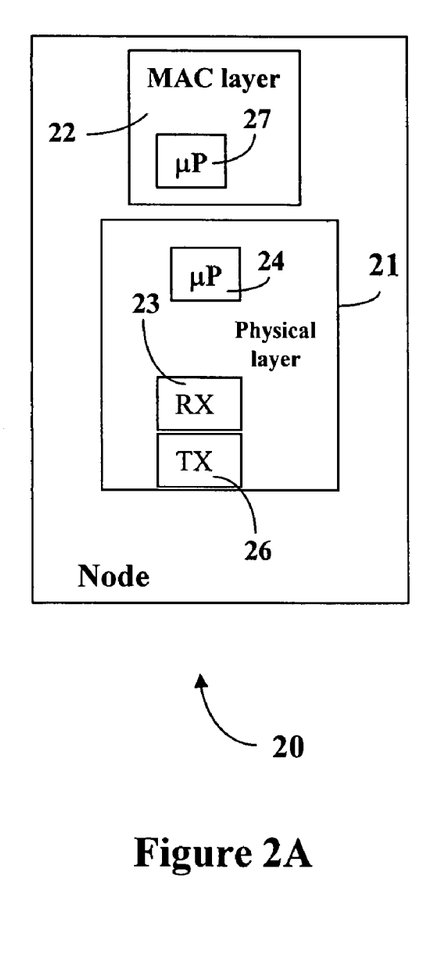
FIG. 2A is a box diagram of an embodiment of the node.
Figure 2B:
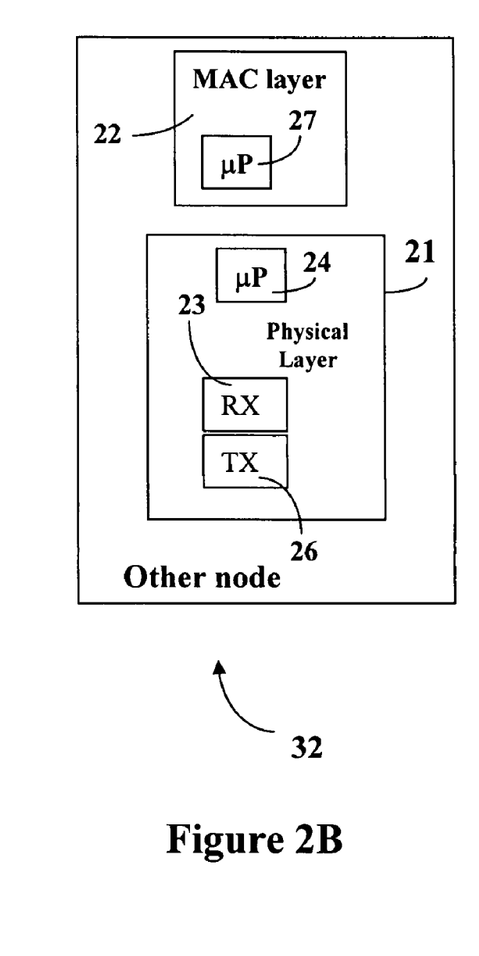
FIG. 2B is a box diagram of an embodiment of another node.

FIG. 2A is a box diagram of an embodiment of the node 20. FIG. 2B is a box diagram of an embodiment of the other node 32. Each of the other nodes 33-37 is similar in function and structure to node 20 and other node 32. The media access control layer 22 and the physical layer 21 are shown for the node 20 and the other node 32. The physical layer 21 in the node 20 and the other node 32 includes a receiver 23, a processor 24 and a transmitter 26. The media access control layer 22 in the node 20 and the other node 32 includes a processor 27. The node 20 and the other nodes 32-37 include a transceiver comprising the transmitter 26 and the receiver 23 that are, respectively, operable to transmit and receive wireless signals and a processor 24 operable to adjust the data rate, redundancy and transmitted power level.

By controlling the level of power transmitted to other nodes 32-37, the node 20 controls its transmitted power level. The node 20 adjusts the power level of transmitted signals to regulate the received signal-to-interference-plus noise ratio of nodes with which it is in communication in order to operate at the minimum SINR needed for the application supported by the node 20. The minimum signal-to-interference-plus noise ratio required for the application is determined from the bit rate or bandwidth needed for that application in the MAC layer. The other nodes 32-37 function in the same manner. Thus, the power transmitted from the node 20 and the other nodes 32-37 is reduced to a level near a minimum level for the node 20 and the other nodes 32-37 while the signal levels and the number of transmitted signals change in time. The term "near a minimum" as defined herein means "at a minimum" or "slightly above a minimum," wherein slightly above includes 1% to 10% above the minimum level. The total transmitted power level is power level of the combined signals transmitted from the node 20 at a given time.

In one implementation of the embodiment of wireless network 10, at least one of the other nodes 32-37 is moving with respect to the node 20. In yet another implementation of the embodiment of wireless network 10, the node 20 is not stationary. For example, the node 20 is located on a moving vehicle. In yet another implementation of the embodiment of wireless network 10, the wireless signals are acoustic signals as required if the vehicles are submarines or unmanned underwater vehicles.

Figure 3:
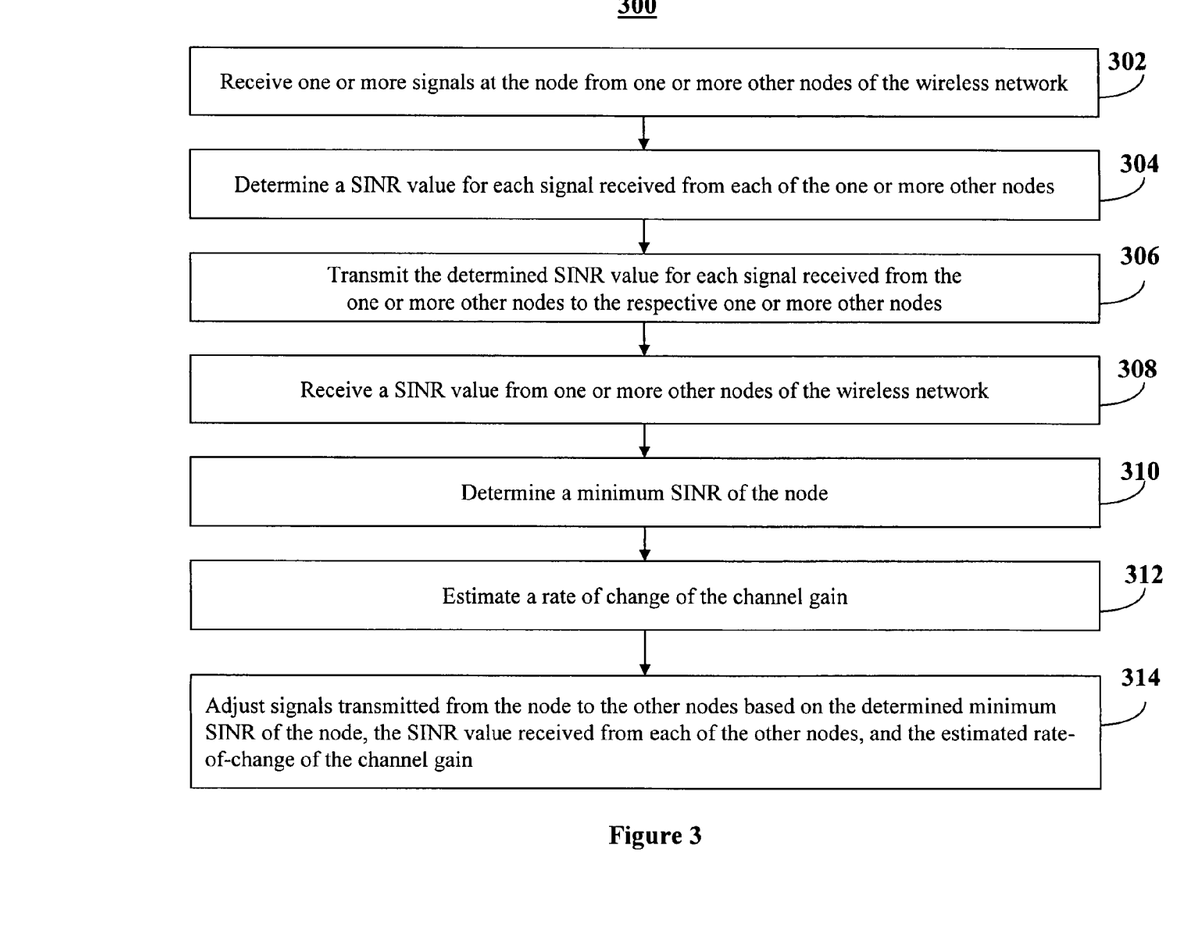
FIG. 3 is a method of an embodiment of controlling power in a wireless network.

FIG. 3 is an embodiment of a method 300 to control power transmitted from the node 20 in a wireless network 10. The node 20 includes hardware and computer readable medium having computer-executable instructions for performing method 300. The method 300 is described with reference to the exemplary wireless network 10 described above with reference to FIG. 1 for the exemplary node 20 and the exemplary other node 32 described above with reference to FIGS. 2A and 2B, respectively.

The node 20 receives one or more signals from one or more other nodes 32-37 of the wireless network 10 (at block 302). The one or more signals are received by the receiver 23 in the physical layer 21 of node 20. The node 20 includes protocols as needed to distinguish the signals from each of the one or more other nodes 32-37. In one implementation of the embodiment of method 300, the node 20 distinguishes code differences between the signals received from each of the one or more other nodes 32-37.

The node 20 determines a signal-to-interference-plus noise ratio (SINR$_{i0}$) for each signal received from the one or more other nodes 32-37 (at block 304). The signal-to-interference-plus noise ratio is written as $$SINR_{il,k} = \frac{x_{il,k} P_{il,k}}{\sum_{j \neq i,l} x_{jl,k} P_{jl,k} + N_{l,k}} \quad (1.1)$$

where $x_{il,k}$ is the channel gain between the $i^{th}$ node and the $l^{th}$ node at the time k. Since the processing gain bandwidth/data rate=W/R of the Direct Sequence Spread Spectrum (DSSS) is common to both the numerator and the denominator, it is not in equation (1.1). In the term SINR$_{i0}$, the subscript i represents the $i^{th}$ other node, such as one of node 32-37, and the subscript 0 represents the node 20. In one embodiment, the processor 24 in the physical layer 21 inputs the values for the received signals, the noise related to the received signals and the interference related to the received signals to the processor 27 to the processor 27 in the media access control layer 22 and the processor 27 calculates the SINR$_{i0}$. In another embodiment, the processor 24 calculates SINR$_{i0}$ and inputs the calculated values to the processor 27 in the media access control layer 22.

The noise contribution in the SINR is the sum of all the noise sources within and between the node 20, and the other nodes 32-37. The noise contribution includes thermal noise of the signal sources in the transmitters 26 in the node 20 and the other node 32-27, and the shot noise in the receivers 23 in the node 20 and the other node 32-27, as known in the art. The noise contribution to the SINR at node 20 is also due to the sum of all the interfering channels or cross talk from all the external nodes 30 and 40 experienced at the node 20 of the wireless network 10. Other noise sources are possible.

The interference contribution to the SINR at node 20 is due to the sum of all the interfering channels or cross talk from all the other nodes 32-37 experienced at the node 20 of the wireless network 10. For example, if a portion of the signal from other node 34 is received at the node 20 within the frequency range for other node 32, that portion of the signal from other node 34 is an interference signal for the other node 32. This type of crosstalk happens when a signal frequency is broadened into the frequency range of a signal at a neighboring frequency or when a signal from an un-linked source at the undesired frequency is scattered into the receiver 23. The scattering and crosstalk mechanisms depend upon the formatting protocol and the structure of the node 20. Other interference sources are possible.

The node 10 transmits the determined value for each signal received from the one or more other nodes 32-37 to the respective one or more other nodes 32-37 (at block 306). For example, SINR$_{0,32}$ is transmitted from the transmitter 26 of node 20 to the other node 32 to indicate the signal-to-interference-plus noise ratio of the last signal received at node 20 from the other node 32. Likewise, SINR$_{0,36}$ is transmitted from the transmitter 26 of node 20 to the other node 36 to indicate the signal-to-interference-plus noise ratio of the last signal received at node 20 from the other node 36.

Since the other nodes 32-37 operate in the same manner as node 10, the other nodes 32-37 transmit signal-to-interference-plus noise ratios to the node 20. Thus, at block 308, the node 20 receives a signal-to-interference-plus noise ratio value from the one or more other nodes 32-37 of the wireless network 10. The receive signal-to-interference-plus noise ratio received at node 20 was determined by each of the other nodes 32-37. For example, SINR$_{35,0}$ is transmitted from other node 35 to node 20 during block 308.

At block 310, media access control layer 22 in the node 20 determines a minimum signal-to-interference-plus noise ratio of the node 20. Specifically, the media access control layer 22 in the node 20 determines a minimum signal-to-interference-plus noise ratio of the node 20 based on the current application of node 20 and based on the signal-to-interference-plus noise ratios received from the other nodes 32-37 at node 20.

The node 20 determines the current application by reading an application header in the data packet of the signal. Different applications require different bandwidths or bit rates. In one implementation of the block 310 in method 300, the node 20 uses a look up table stored in a memory of the node 20 to determine the bandwidth or bandwidth range required by the current application of the node 20. In another implementation of the block 310 in method 300, the node 20 applies algorithms in the processor 24 in the physical layer 21 or processor 27 in the media access control layer 22 to estimate the prior noise environment in order to determine the bandwidth required by the current application of the node 20. The node 20 adjusts its SINR$_{min}$ based on the current application, power limits of the transceiver, its energy storage capacity and the noise environment.

The analysis described for block 310 applies while the physical layer 21 is operating normally to transmit the signals to the nodes linked to node 20. The receiver 23 in the physical layer 21 of node 20 receives a signal-to-interference-plus noise ratio value from each of the other nodes 32-37 (referred to here as "physical layer parameters"). The processor 24 in the physical layer 21 inputs physical layer parameters to the processor 27 in the media access control layer 22 of node 20. The processor 27 receives the physical layer parameters at the media access control layer 22 of the node 20 from the physical layer 21 of the node 20. The processor 27 in the media access control layer 22 determines convergent system behavior based on the physical layer parameters and generates a response parameter. In the event that the SINR$_{min}$ resulted in oscillatory behavior, the response parameter is a new SINR$_{min}$. The processor 27 transmits the response parameters to the physical layer 21 responsive to the determined convergent behavior. The processor 24 regulates the power levels at the node 20 based on the received response parameters.

In order to describe these operations in more detail, a mathematical definition of convergent behavior of the wireless network 10 is developed below. Convergent behavior can be detected when the SINRs from different transmitters settle down to within a narrow range. If the settling does not happen within a short time, for example within 2 seconds, the wireless network 10 is not converging. In that case, the wireless network 10 reduces the set point in the power control rule as described below. All of the nodes of the wireless network 10, including node 20 and the other nodes 32-37, modify their transmit power according to the following rule:

$$P_{il,k+1} = P_{il,k}(SINR_{il,min}/SINR_{il,k}). \quad (1.2)$$

$P_{il,k}$ is the transmitted power of the $i^{th}$ node at the time k and SINR$_{il,min}$ is the minimum SINR needed by the $i^{th}$ node for the $l^{th}$ node to receive signal from the $i^{th}$ node within the required bit error rate. The set of minimum signal-to-interference-plus noise ratios SINR$_{il,min}$ for each currently established $i^{th}$ node and $l^{th}$ node is the minimum signal-to-interference-plus noise ratio for a current bandwidth of the link. The minimum signal-to-interference-plus noise ratio for a required bandwidth for reception at node 20 occurs when all the other nodes 32-37 connected to the node 20 are operating with a SINR level of $SINR_{i0,min}$. The other nodes can likewise experience a minimum signal-to-interference-plus noise ratio for a current bandwidth of the exemplary node 37 when the node 20 and all the other nodes 32-36 connected to the node 37 are operating with a SINR level of $SINR_{i37,min}$. Based on equation (1.2), the node 20 increases the power level of signal transmitted to the other nodes 32-37 if the received SINR is less than the desired $SINR_{il,min}$. Likewise, based on equation (1.1), the node 20 decreases the power level of signal transmitted to the other nodes 32-37 if the received SINR is greater than the desired $SINR_{il,min}$. The measurement of signal-to-interference-plus noise ratio is useful in spread spectrum communication which is used in systems in which multiple users simultaneously transmit over a shared channel. In such systems, the users of a shared channel create interference for each other. Examples of spread spectrum communication include direct sequence spread spectrum (DSSS) (for example, code division multiple access or CDMA), frequency hopping spread spectrum (FHSS), ultra-wideband (UWB), and combinations thereof. By substituting equation (1.1) into (1.2), the power control law becomes:

$$P_{il,k+1} = \left(\frac{SINR_{il,min}}{x_{il,k}}\right)\left(\sum_{j \neq i,l} x_{jl,k} P_{jl,k} + N_{l,k}\right) \quad (1.3)$$

The algorithms in the media access control layer 22 dynamically calculate the $SINR_{il,min}$ for all other nodes 32-37 currently linked to node 20 for the bandwidth required. This calculation is performed periodically over time intervals longer than are needed for convergence of power control. Power control is typically performed in a small time slot before the data is sent. If any one of the other nodes 32-37 is operating with a signal-to-interference-plus noise ratio that is greater than the calculated $SINR_{il,min}$, the power level transmitted within wireless network 10 is above the minimum signal-to-interference-plus noise ratio for a current bandwidth of the nodes 20 and 32-37. As the population of other nodes 32-37 changes, the minimum signal-to-interference-plus noise ratio for a current bandwidth of the node 20 changes. In one embodiment, all the links between the nodes 20, 32-37 have the same $SINR_{il,min}$.

In order to determine that $SINR_{il,min}$ are fixed-points for the scheme in equation (1.3) and to determine the conditions for the existence of the fixed-points, assume that the noise power at the receiver 23 in the node 20 connected to other nodes 32-37 is a constant equal to $N_0$. Also, assume that the channel gains $x_{il,k} = x_{i0}$ for all other nodes 32-37 connected to node 20 are static. The node 20 is the $0^{th}$ node and the subscript 0, as used herein, refers to the node 20. The condition for a fixed-point for the power control laws of the set of equations (1.3) is written in matrix form as:

$$A_{PC} P_{r0} = N_0 \mathbf{1} \quad (2.1a)$$

$$A_{PC} = \begin{bmatrix} \frac{1}{SINR_{10,min}} & -1 & \cdots & -1 \\ -1 & \frac{1}{SINR_{20,min}} & \cdots & -1 \\ \vdots & \ddots & \ddots & \vdots \\ -1 & -1 & \cdots & \frac{1}{SINR_{n0,min}} \end{bmatrix} \quad (2.1b)$$

-continued $$P_{r0} = \begin{pmatrix} x_{10} P_{10} \\ \vdots \\ x_{n0} P_{n0} \end{pmatrix}, \mathbf{1} = \begin{pmatrix} 1 \\ \vdots \\ 1 \end{pmatrix}_{n \times 1} \quad (2.1c)$$

where $P_{r0}$ is the array of received power at node 20. The matrix $A_{pc}$ is rewritten as $$A_{Pc} = I_n + diag\left\{\frac{1}{SINR_{10,min}} \frac{1}{SINR_{20,min}} \cdots \frac{1}{SINR_{n0,min}}\right\} - \mathbf{1}\mathbf{1}^T \quad (2.2)$$

whose inverse is given by the matrix identity for $$B = A + XRY, \quad (2.3a)$$
$$B^{-1} = A^{-1} - A^{-1} X (R^{-1} + YA^{-1} X)YA^{-1}$$

yielding $$A_{PC}^{-1} = diag\{d\} + \frac{dd^T}{1 + \sum_{i=1}^{n} d_i}$$

$$d = \left[\frac{1}{1 + \frac{1}{SINR_{10,min}}} \frac{1}{1 + \frac{1}{SINR_{10,min}}} \cdots \frac{1}{1 + \frac{1}{SINR_{10,min}}}\right] \quad (2.3b)$$

The fixed-point is therefore given by $$P_{r0} = \frac{N_0}{1 - \sum_{i=1}^{n} d_i} d. \quad (2.4)$$

The existence of the fixed-point is guaranteed if $$\sum_{i=1}^{n} d_i < 1,$$

that is, if $$\sum_{i=1}^{n} \frac{1}{1 + \frac{1}{SINR_{i0min}}} < 1.$$

Thus, the transmit power at each of the other nodes 32-37 at the fixed-point is $$P_{i0} = \frac{N_0 d_i}{x_{i0}\left(1 - \sum_{i=1}^{n} d_i\right)} \quad (2.5)$$

At the fixed-point, all the other nodes 32-37 have the desired minimized signal-to-interference-plus noise ratios $SINR_{i0,min}$ for the minimum signal-to-interference-plus noise ratio for a current bandwidth of the node 20 to be met. In the exemplary case in which all the other nodes 32-37 linked to node 20 have identical requirements for SINR$_{min}$, the transmit power from each of the other nodes 32-37 to the node 20 simplifies to:

$$P_{i0} = \frac{N_0 \text{SINR}_{\min}}{x_i(1 - (n-1)\text{SINR}_{\min})} \quad (2.6)$$

where n is the number of nodes connected to node 20 and SINR$_{i0,min}$<1/(n−1) for feasible positive solution to the system of equations. Thus, there is an equalization of received power at node 20 from all of the other nodes 32-37 connected to the node 20.

It is shown below that the wireless network 10 converges to the fixed-point $P_{r0}$ of equation (2.4). Since this distributed implementation of a wireless network 10 converges to the fixed-point defined by equation (2.5), the total transmitted power of each of the nodes 20, 32-37 in the wireless network 10 has convergent behavior within the physical layer of the node 20.

To prove the wireless network 10 converges, the equations are perturbed to obtain the evolution of the difference between the solution of the system of difference equations and their fixed-point. When $\delta_{i0,k}$ denotes the respective difference variables of power from the fixed-point, the system of equations, $$\delta_{i0,k+1} = \left(\frac{\text{SINR}_{i0,\min}}{x_{i0}}\right)\left(\sum_{j \ne i,0} x_{j0}\delta_{j0}\right) \quad (3.1)$$

is written in matrix form as:

$$\delta_{k+1} = A_{st}\delta k \quad (3.2)$$

where $\delta_k = \lfloor x_{10}\delta_{10,k}, \ldots x_{n0}\delta_{n0,k} \rfloor$ and $$A_{st}(i, j) = \begin{cases} \text{SINR}_{j0,\min} & \text{if } i \ne j \\ 0 & \text{if } i = j \end{cases} \quad (3.3)$$

The eigenvalues of equation (3.3) must be less than one for convergence of the system solution to the fixed-point. From the Gersgorin disk theorem, as known in the art, each of the eigenvalues λ of $A_{st}$ is bounded as follows:

$$|\lambda| \le (n-1)\text{SINR}_{i0,\min}. \quad (3.4)$$

Thus, each of the signal-to-interference-plus noise ratios must be less than 1/(n−1) for stability. This is based on a conservative bound which is the best possible under the distributed calculation where the required throughputs of different transmitter are not known to other transceivers not in communication with them. In the special case where all the demanded throughputs are equal, there is equalization of received power at the common receiver of node 20 and the eigenvalues λ are (n−1)SINR$_{min}$, -SINR$_{min}$, -SINR$_{min}$, . . . , -SINR$_{min}$. Thus, the bound is exact in this special case. The condition for stability also ensures the existence of the fixed-point since, $$\sum_{i=1}^{n} \frac{1}{1 + \frac{1}{\text{SINR}_{i0,\min}}} < \sum_{i=1}^{n} \frac{1}{1 + \frac{1}{1/n - 1}} = 1 \quad (3.5)$$

when SINR$_{i0,min}$<1/(n−1) for all i=1, . . . , n.

Thus, the processor 27 in the media access control layer 22 of node 20 determined physical layer conditions for convergence of the physical layer to the fixed-point SINR$_{i0,min}$ and modifies the SINR$_{i0,min}$ set points based on the determined physical layer conditions for convergence of the physical layer to the fixed-points. The processor 27 transmits response parameters to the physical layer 21 responsive to the determined convergent behavior. The node 20 adjusts the transmitted power based on the set-point SINR$_{i0,min}$. If the SINR$_{i0,min}$ set point does not result in convergence of received power level at node 20, the i$^{th}$ node may change its SINR$_{i0,min}$ set point. The phrase "minimum signal-to-interference-plus noise ratio set point" and "SINR$_{i0,min}$ set point" are used interchangeably throughout this document. As defined herein, SINR$_{i0,min}$ is the set point for received SINR at node 20 for the i$^{th}$ node.

The local-control linking node 20, the first wireless nodes 30 and the second wireless nodes 40 include the hardware and the computer readable medium storing a computer program operable to perform these functions to dynamically adjust power levels as the decentralized wireless network 10 changes. The decentralized wireless network 10 has changing numbers other nodes 32-37 that are in communication with node 20. The physical layer 21 is continuously or periodically transmitting the physical layer parameters to the processor 27 in the media access control layer 22. In one embodiment, the processor 24 periodically transmits the received physical layer parameters to the processor 27 in the media access control layer 22 with a period of about 2 seconds.

In one embodiment, the processor 24 calculates the received SINR$_{i0}$ at the physical layer 21 and transmits the SINR$_{i0}$ as the physical layer parameter for each node to the processor 27 in the media access control layer 22.

At block 312, the media access control layer 22 in the node 20 estimates a rate-of-change of the channel gain with the other nodes 32-37 and node 20 using the data transmitted from the physical layer 21. The node 20 experiences a change in the channel gain when there is relative movement between the other nodes 32-37 and node 20. The channel gain changes when one of the other nodes 32-37 is operated from a vehicle which is moving with respect to the node 20.

The analysis for determining a minimum signal-to-interference-plus noise ratio for a current bandwidth of the node 20 of the wireless network 10, as described above with reference to block 310, assumed constant channels or static channel gains. This is not generally the case when the other nodes 32-37 and/or the node 20 are mobile. The channel gains for mobile nodes sometimes jump by 10 to 20 dB when the mobile node moves over half a transmission signal wavelength in a multipath environment with many operational channels.

If the scheme described in block 310 has a very high convergence rate and the other nodes 32-37 only required low power transmission levels, then the scheme converges. Step changes in channel gain, as occur in a multipath environment, are currently dealt with by reducing throughput demand between the other nodes 32-37. In decentralized wireless network 10 where channel gain ramps at constant rates, it is possible to improve on this constraint. When $x_{il,k}=1/\alpha^*_{il}x_{il,k-1}$ and $\alpha^*_{il}>0$, it is possible to improve the convergence by setting:

$$\alpha_{il,k} = (1-\beta)\alpha_{il,k-1} + \beta\frac{P_{il,k-1}SINR_{il\,k-2}}{P_{il,k-2}SINR_{il\,k-1}} \quad (4.1)$$

$$p_{il,k+1} = \alpha_{il,k}p_{il,k+1}\frac{SINR_{il,\min}}{SINR_{il\,k}} \quad (4.2)$$

where $\alpha_{il}$ is an estimate of the rate of change of the channel gain for link between the $i^{th}$ node and the $l^{th}$ node, and $\beta$ is the gain filter parameter with the constraint $0<\beta<1$. The scheme has a fixed-point $P_{r0}$ (equation 2.4) for each of the nodes with a constant $$\alpha^*_{il}=x_{il,k-1}/x_{il,k}$$

and $$x_{il,k}P_{il,k}=K_{il}=\text{constant for all } i=1,\ldots,n.$$

Thus, $SINR_{il,k}=SINR_{il,\min}$ at the fixed-point for each node. Stability analysis is complex and involves use of the small-gain theorem. The linearization of the scheme around the fixed-point becomes, after some simplification:

$$d\alpha_{il,k} = (1-2\beta)d\alpha_{il,k-1} + \beta d\alpha_{il,k-2} + \beta\alpha^*_{il}(x_{il,k}\delta_{il,k} - x_{il,k-1}\delta_{il,k-1}) \quad (4.3)$$

$$\delta_{il,k+1} = \frac{K_{il}SINR_{il,\min}}{\alpha^*_{il}}d\alpha_{il,k} + SINR_{il,\min}\sum_{j\neq i,l}x_{il,k}\delta_{il,k} \quad (4.4)$$

where $d\alpha$ and $\delta$ represent perturbations of channel growth factor $\alpha$ and transmit power P from the fixed-point. A preliminary analysis based on the above linearization yields a necessary condition for stability of the set of equations (4.1). The stability conditions of the system without ramp tracking are $0<\beta<2/3$ and $SINR_{i0}, \min<\beta<1/(n-1)$ for all $i=1,\ldots,n$.

The small gain analysis provides a conservative sufficient condition of $x_{il,k}P_{il,k}\beta<(n-1)SINR_{il}$, min where $$x_{il,k}P_{il,k} = \text{constant} = \frac{N_0 d_i}{\left(1-\sum_{i=1}^{n}d_i\right)},$$

with $d_i$ given by equation (2.3). Since the received power varies over a range of values, $\beta$ is chosen small enough to permit the stability in a wide variety of situations. For small $\beta$, the wireless network 10 has convergent system behavior for the total transmitted power level and for the estimated rate-of-change of the channel gain within a physical layer of the node 20 for a minimum signal-to-interference-plus noise ratio $SINR_{\min}$, even when node 20 is communicating with several other transmitters.

At block 314, the node 20 adjusts the signals transmitted from the node 20 to the other nodes 32-37 based on the minimum signal-to-interference-plus noise ratio to support the bandwidth required by the current application of the node, the signal-to-interference-plus noise ratio value received from each of the other nodes 32-37, and the estimated rate of change of channel gain. In this manner, the total power level transmitted from the node is maintained near a minimum power level.

The power level adjustment is a fixed-point $SINR_{i0,\min}$ for each node in the other nodes 32-37 with a $SINR_{il,k}$ greater than the $SINR_{il,\min}$.

As defined herein, the set-point $SINR_{i0,\min}$ is the SINR that brings the total received power at node 20 from the node i to the minimum power level that satisfies the demands of the link.

The response of each of the other nodes 32-37 to the fixed-point $SINR_{i0,\min}$ is now described with reference to the exemplary other node 32. In one embodiment, in response to the set-point $SINR_{i0,\min}$ from the node 20, the level of power transmitted from the other node 32 is increased or decreased. For example, the power level of the signals transmitted to the other nodes 32-37 is decreased if the minimum signal-to-interference-plus noise ratio set point is less than the received signal-to-interference-plus noise ratio. Likewise, the power level of the signals transmitted to the other nodes 32-37 is increased if a minimum signal-to-interference-plus noise ratio set point $SINR_{i0,\min}$ is greater than the received signal-to-interference-plus noise ratio.

In another embodiment, in response to the convergence or otherwise of the received SINR at node 20 to the set point $SINR_{i0,\min}$, the data rate of the signals transmitted from the other node 32 is increased or decreased. In yet another embodiment, in response to the set point $SINR_{i0,\min}$ from the node i, the redundancy of the signals transmitted to node 20 is increased or decreased. In yet another embodiment, in response to the set point $SINR_{i0,\min}$ from the node i to the node 20, the other node 32 modifies the transmission power level, the data rate and/or the redundancy of the transmitted signals. All these changes are operable to adjust the transmission power received at the node 20 from the other nodes 32-37 depending on the noise and interference from the environment.

Thus, each node 20 in the exemplary wireless network 10 of FIG. 1 receives a signal-to-interference-plus noise ratio value from all the other nodes 32-37 with which it communicates. Based on those physical layer parameters each node 20 estimates a rate-of-change of the channel gain and adjusts its transmit power until its received signal-to-interference-plus noise ratio converges to its signal-to-interference-plus noise ratio set point. Each node 20 in the exemplary wireless network 10 determined physical layer conditions for convergence of the physical layer 21 to the $SINR_{i0,\min}$ set point and modified the $SINR_{i0,\min}$ set points if necessary, based on the determined physical layer conditions for convergence of the physical layer 21 to the fixed-points. Each node in the exemplary wireless network 10 adjusts its power level and again transmits the received $SINR_{i0}$ to the respective other nodes. In this manner the wireless network 10 is dynamically adjusted as each node controls the power transmitted from the node 20 in response to physical layer parameters from all the other nodes.

Although specific embodiments have been described herein, it will be appreciated by those of skill in the art that other system configurations for the decentralized wireless network may be substituted for the specific embodiments described. This application is intended to cover any adaptations and variations of the present invention. Therefore it is manifestly intended that this invention be limited only by the claims and the equivalents thereof.

What is claimed is:

1. A method to control power transmitted from a node in a wireless network, the method comprising:

receiving one or more signals at the node from one or more other nodes of the wireless network;

determining a signal-to-interference-plus noise ratio for each signal received from each of the one or more other nodes;

transmitting the determined signal-to-interference-plus noise ratio value for each signal received from the one or more other nodes to the respective one or more other nodes;

receiving a signal-to-interference-plus noise ratio value from each of the other nodes in the wireless network, wherein the receive signal-to-interference-plus noise ratio value was determined by each of the other nodes;

determining a minimum signal-to-interference-plus noise ratio of the node;

estimating a rate-of-change of the channel gain; and adjusting signals transmitted from the node to the other nodes based on the determined minimum signal-to-interference-plus noise ratio of the node, the signal-to-interference-plus noise ratio value received from each of the other nodes, and the estimated rate-of-change of the channel gain, wherein a total power level transmitted from the node is maintained near a minimum power level.

2. The method of claim 1, wherein at least one of other nodes is moving relative to the node.

3. The method of claim 1, wherein determining a minimum signal-to-interference-plus noise ratio of the node comprises:

determining the bandwidth required to support a current application of the node; and determining convergent system behavior for a fixed-point minimum signal-to-interference-plus noise ratio within a physical layer of the node.

4. The method of claim 1, wherein estimating a rate-of-change of the channel gain comprises:

determining convergent system behavior for a gain filter parameter within a physical layer of the node.

5. The method of claim 1, wherein adjusting signals comprises:

adjusting the power level of the signals transmitted from the node to the other nodes.

6. The method of claim 5, wherein adjusting the power level of the signals comprises:

decreasing a power level of the signals transmitted to the other nodes if a minimum signal-to-interference-plus noise ratio set point is less than a received signal-to-interference-plus noise ratio.

7. The method of claim 5, wherein adjusting the power level of the signals comprises:

increasing a power level of the signals transmitted to the other nodes if a minimum signal-to-interference-plus noise ratio set point is greater than a received signal-to-interference-plus noise ratio.

8. The method of claim 5, wherein adjusting signals further comprises:

adjusting a data rate of the signals based on the determined minimum signal-to-interference-plus noise ratio for a current bandwidth of the node and the estimated rate-of-change of the channel gain.

9. The method of claim 5, wherein adjusting signals further comprises:

adjusting a redundancy of the signals based on the determined minimum signal-to-interference-plus noise ratio for a current bandwidth of the node and the estimated rate-of-change of the channel gain.

10. The method of claim 1, wherein the wireless network uses a spread spectrum formatting code.

11. The method of claim 10, wherein the spread spectrum formatting code is selected from the group comprising a direct sequence spread spectrum, frequency hopping spread spectrum, ultra-wideband, and combinations thereof.

12. The method of claim 1, wherein the wireless signals are acoustic signals.

13. A system to dynamically control power in a wireless network, the system comprising:

means for receiving physical layer parameters at a media access control level of a node from a physical layer of the node;

means for determining convergent system behavior within the node based on the received physical layer parameters;

means for transmitting response parameters to the physical layer responsive to the determined convergent system behavior; and means for regulating transmit power levels at the node based on the received response parameters.

14. The system of claim 13, wherein the means for determining convergent system behavior comprise:

means for determining a minimum signal-to-interference-plus noise ratio for a current bandwidth of the node;

means for estimating a rate-of-change of the channel gain having resultant fixed-points within the physical layer of the node;

means for determining physical layer conditions for convergence of the physical layer to the fixed-points; and means for modifying signal-to-interference-plus noise ratio set points based on the determined physical layer conditions for convergence of the physical layer to the fixed-points.

15. A computer readable medium having computer-executable instructions for performing a method comprising:

receiving signals at the node from other nodes of the wireless network at a node;

determining a signal-to-interference-plus noise ratio for each signal received from each of the one or more other nodes;

transmitting the determined signal-to-interference-plus noise ratio value for each signal received from the one or more other nodes to the respective one or more other nodes;

receiving a signal-to-interference-plus noise ratio value from each of the other nodes in the wireless network, wherein the receive signal-to-interference-plus noise ratio was determined by each of the other nodes;

determining a minimum signal-to-interference-plus noise ratio of the node;

estimating a rate-of-change of the channel gain; and adjusting signals transmitted from the node to the other nodes based on the determined minimum signal-to-interference-plus noise ratio of the node, the received signal-to-interference-plus noise ratio received from each of the other nodes, and the estimated rate-of-change of the channel gain, wherein a total power level transmitted from the node is maintained near a minimum power level.

16. The medium of claim 15, wherein the computer-executable instructions for determining a minimum signal-to-interference-plus noise ratio of the node comprise:

determining the bandwidth required to support a current application of the node; and determining convergent system behavior for a fixed-point minimum signal-to-interference-plus noise ratio within a physical layer of the node.

17. The medium of claim 15, wherein the computer-executable instructions for estimating a rate-of-change of the channel gain comprise:

determining convergent system behavior for a gain filter parameter within a physical layer of the node.

18. The medium of claim 15, wherein the computer-executable instructions for adjusting signals comprise:
adjusting the power level of the signals based on the determined minimum signal-to-interference-plus noise ratio for a current bandwidth of the node and the estimated rate-of-change of the channel gain.

19. The medium of claim 18, wherein computer-executable instructions for adjusting the power level of the signals comprise:
decreasing a power level of the signals transmitted to the other nodes if a minimum signal-to-interference-plus noise ratio set point is less than a received signal-to-interference-plus noise ratio.

20. The medium of claim 18, wherein computer-executable instructions for adjusting the power level of the signals comprise:
adjusting a data rate of the signals based on the determined minimum signal-to-interference-plus noise ratio for a current bandwidth of the node and the estimated rate-of-change of the channel gain.

21. The medium of claim 18, wherein computer readable code for adjusting the power level of the signals comprises:
adjusting a redundancy of the signals based on the determined minimum signal-to-interference-plus noise ratio for a current bandwidth of the node and the estimated rate-of-change of the channel gain.

* * * * *

UNITED STATES PATENT AND TRADEMARK OFFICE
CERTIFICATE OF CORRECTION

PATENT NO.      : 7,603,136 B2                                Page 1 of 1
APPLICATION NO. : 11/269383
DATED           : October 13, 2009
INVENTOR(S)     : Kartik B. Ariyur It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1009 days.

Signed and Sealed this

Fifth Day of October, 2010

David J. Kappos
*Director of the United States Patent and Trademark Office*